United States Patent
Honeyager et al.

[15] 3,659,630
[45] May 2, 1972

[54] TRANSMISSION CONTROL SYSTEM

[72] Inventors: Robert G. Honeyager, Oak Creek; James C. Rigney, Racine, both of Wis.

[73] Assignee: J. I. Case Company

[22] Filed: July 20, 1970

[21] Appl. No.: 63,969

Related U.S. Application Data

[62] Division of Ser. No. 837,547, June 30, 1969, Pat. No. 3,608,397.

[52] U.S. Cl. .............................................137/596
[51] Int. Cl. ..............................................F16k 11/10
[58] Field of Search................74/720.5, 752, 336, 867, 868, 74/869, 360, 364, 665; 137/596

[56] References Cited

UNITED STATES PATENTS 3,174,362  3/1965  Fisher et al. .....................74/720.5
3,429,328  2/1969  Morris et al. ....................137/596

Primary Examiner—Henry T. Klinksiek
Attorney—Dressler, Goldsmith, Clement & Gordon

[57] ABSTRACT

A hydraulic control system for controlling actuation of a plurality of fluid operated friction devices forming part of a transmission for a vehicle with the system including speed and direction valves and a range valve engaged at all speeds. The system further includes a modulator valve which reduces the pressure of fluid supplied to the range valve to selectively control engagement of fluid couplings associated therewith. The modulating valve is designed for automatic operation during normal shifting of the speed and direction valves between neutral and engaged positions and alternatively manually operable at the discretion of the operator.

19 Claims, 4 Drawing Figures

Patented May 2, 1972

INVENTORS
Robert G. Honeyager
James C. Rigney

BY Dressler, Goldsmith, Clement & Gordon
ATTORNEYS

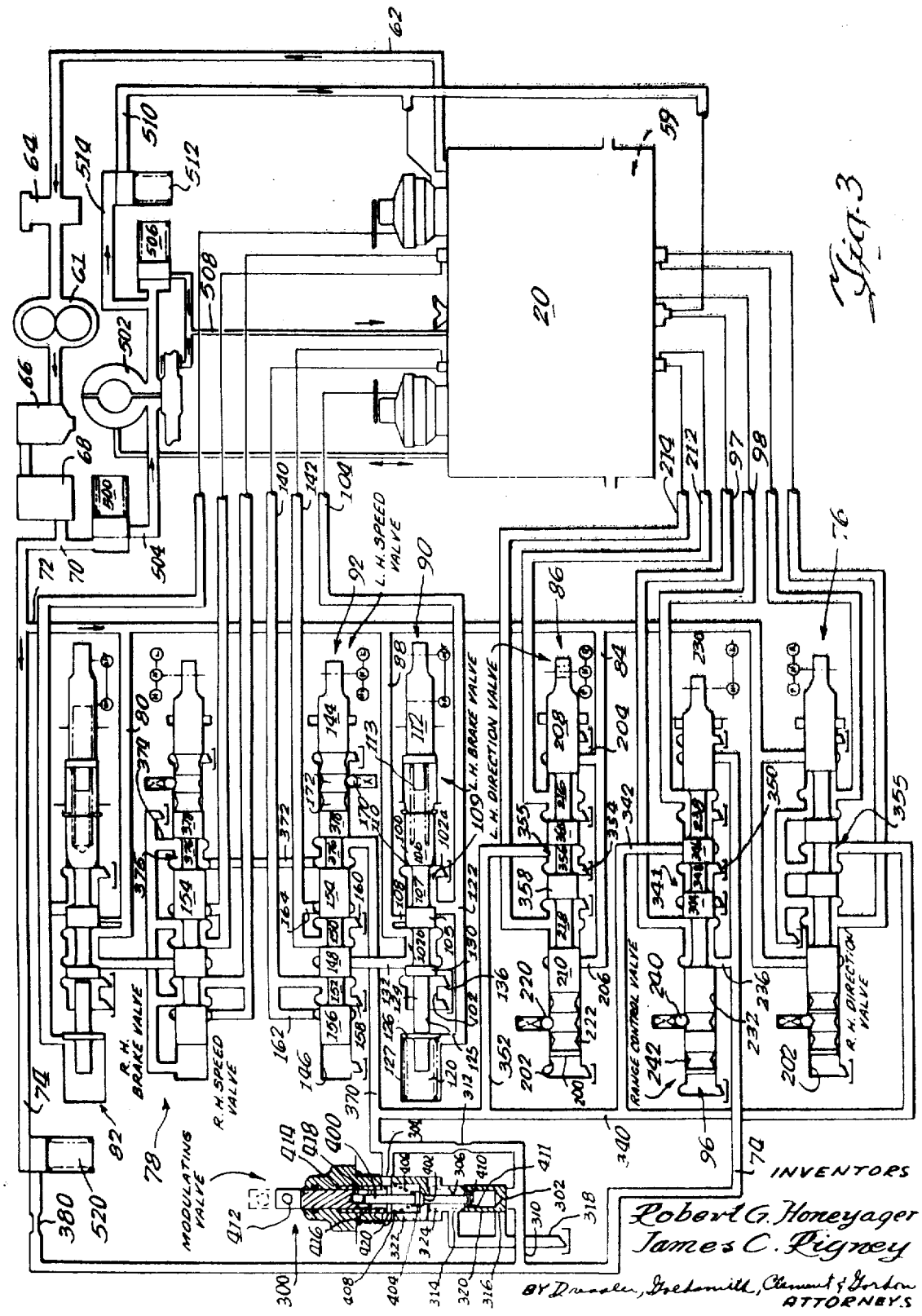

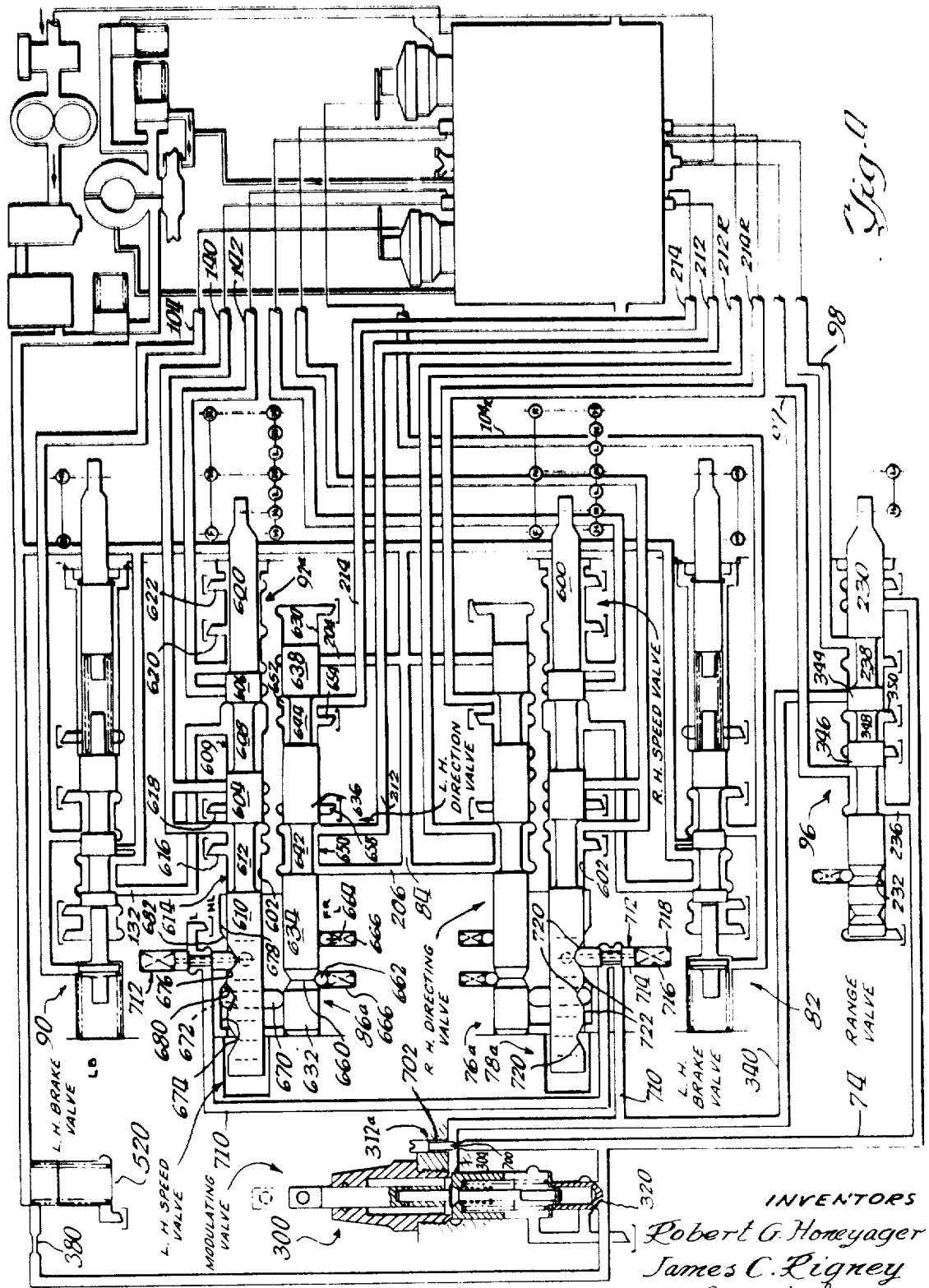

3,659,630

TRANSMISSION CONTROL SYSTEM

CROSS REFERENCE TO RELATED APPLICATIONS

This application is a divisional application of applicants' copending application Serial No. 837,547, filed June 30, 1969, now U.S. Pat. No. 3,608,397.

BACKGROUND OF THE INVENTION

The present invention relates generally to transmission controls for vehicles and more particularly to an improved hydraulic control system for selectively supplying fluid to a plurality of friction devices forming part of the transmission.

While the invention disclosed herein may be utilized in various types of vehicles and other power units, it is believed that it has particular utility in connection with crawler-type tractors and, therefore, such an environment will be utilized in describing the present invention.

Generally, crawler-type tractors have heretofore been maneuvered by braking the drive to one of the tracks in order to pivot the unit about that track. However, maneuvering in this manner requires considerable space and dexterity of the operator. Also, it is virtually impossible to maneuver the vehicle within close quarters and the braking method of turning results in a rather jerky motion of the tractor during such maneuvering operations.

Recently, transmissions for crawler-type tractors have incorporated hydraulically operated fluid couplings which allow maneuvering of the vehicle by selective engagement and disengagement of the associated clutches forming part of the transmission. Such a hydraulic control circuit for controlling a transmission is disclosed in Baker U.S. Pat. No. 3,017,941.

While the patented hydraulic control circuit for a crawler-type tractor has overcome most of the objections regarding the maneuverability of a machine of this type, there still remains a need for a transmission and control which is capable of shifting the transmission between various speed and direction ratios without having a rather jerky motion of the tractor during such speed and direction changes.

SUMMARY OF THE INVENTION

Therefore, it is a primary object of the present invention to provide improved vehicle drive means including a novel hydraulic control circuit for fluid couplings in the transmission.

Another object is to provide an improved vehicle drive means which is capable of controlled engagement whenever the drive means is moved between neutral and engaged positions.

A further object of the invention is to provide an improved hydraulic control circuit for a transmission which incorporates modulating mechanism for controlling the pressure of fluid supplied to fluid couplings in the transmission.

A still further object of the invention is to provide an improved hydraulic control circuit for a transmission which incorporates interrelated valve means which are capable of being actuated by a single control mechanism.

Other objects and advantages of the present invention will become apparent from the following detailed description when taken in conjunction with the accompanying drawings.

BRIEF DESCRIPTION OF DRAWINGS

FIG. 3 is a schematic illustration of the hydraulic control circuit for the transmission unit shown in FIG. 2 and incorporating the details of the present invention; and FIG. 4 is a schematic view similar to FIG. 3 showing a slightly modified embodiment of the hydraulic control circuit of the present invention.

DETAILED DESCRIPTION

Figure 1:
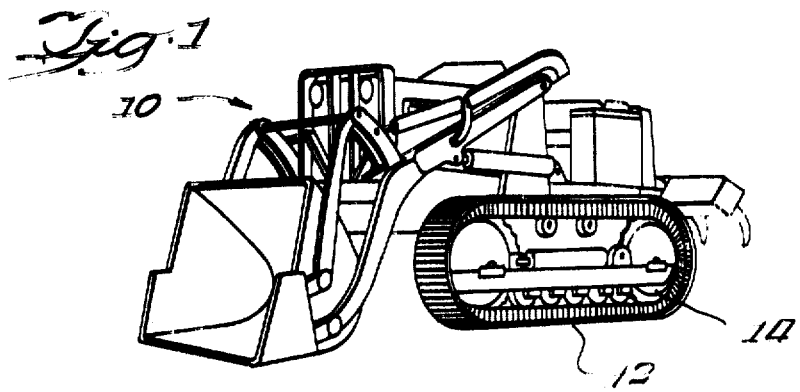
FIG. 1 is a perspective view of a vehicle which is capable of having the present invention incorporated therein.

FIG. 1 of the drawings discloses a crawler-type tractor 10 having endless tracks 12 driven by drive sprockets 14. The tractor also has earth working implements supported thereon which need not be described in detail since they form no part of the present invention.

Figure 2:
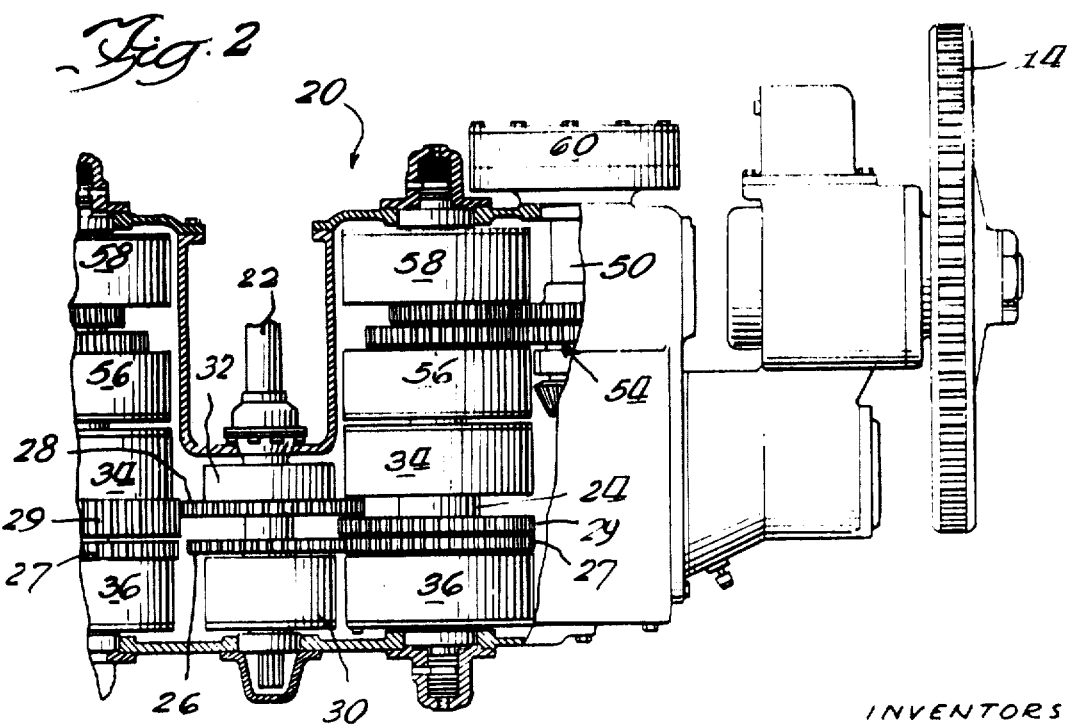
FIG. 2 is a fragmentary plan view partially in section of a transmission unit incorporated in the vehicle shown in FIG. 1.

FIG. 2 of the drawings discloses a transmission unit of the type disclosed in Gerst et al. U.S. Pat. No. 2,866,360. The transmission 20 is generally symmetrical with respect to an input shaft 22 and, thus, only one half of the transmission will be described in detail.

The input shaft 22 is operatively connected to intermediate or lay shafts 24 through gears 26 and 28 in mesh with gears 27 and 29 and which are selectively connected to the input shaft by a pair of clutches or fluid couplings 30 and 32. Thus, engagement of either of the fluid couplings 30 or 32 will cause a corresponding rotation of countershafts 24 in response to rotation of drive shaft 22. The drive shaft 22, as in all vehicles of this type, is connected to an engine (not shown in detail).

The respective gears 27 and 29 are freely rotatable on countershaft 24 and are adapted to be operatively connected thereto by forward and reverse clutches 34 and 36 which have clutch elements respectively connected to the gears and to the countershaft 24. In this manner, shaft 24 may be rotated in either direction and at two different ranges depending upon the engagement of either fluid coupling 30 and 32 and fluid coupling 34 or 36.

The drive sprocket 14 is suitably connected to a further countershaft 50 through suitable gearing and shafts carried within housing 52 and forming the final drive means for one side or endless track 12 of the tractor 10. In the illustrated embodiment, the countershaft 50 is adapted to be driven through gearing 54 at two different speed ranges with respect to countershaft 24 by selective engagement of the low range track clutch or fluid coupling 56 and the high range track clutch or fluid coupling 58. A further fluid coupling 60 cooperates with shaft 50 to define a braking mechanism for one side of the crawler tractor.

Since all of the elements with the exception of the improved fluid couplings 30 and 32 are identical to those disclosed in the above mentioned Gerst et al. patent, any further details regarding the construction and operation of the transmission unit may be obtained by review of said patent.

FIGURE 3 EMBODIMENT

The hydraulic control circuit disclosed in FIG. 3 includes a reservoir 59 formed in the bottom of the housing of the transmission unit 20 and connected to a pump 61 through a conduit 62 and a filtering mechanism 64. The pressured fluid developed by pump 61 is passed through a further filter 66 and an oil cooler 68 incorporated in conduit 70 which defines the pressured fluid source for the respective fluid couplings 30, 32, 34, 36, 56, 58 and 60 disposed within the transmission unit 20.

The pressured fluid source is divided into branch conduits 72 and 74 which feed pressured fluid to the respective valves in the manner to be described. Thus, branch conduit 72 defines the pressured fluid source for the right-hand forward-reverse valve 76 and is connected to right-hand high-low speed control valve 78 through a further by-pass conduit 80 which also supplies the pressured fluid to the right-hand brake control valve 82 in a manner which will become apparent hereinafter. By-pass conduit 84 supplies pressured fluid to the left-hand forward-reverse or direction control valve 86 while by-pass conduit 88 supplies pressured fluid to the brake control valve 90 and the left-hand high-low speed control valve 92. The conduit 74 supplies pressured fluid to the range control valve 96 which is operatively connected to fluid couplings 30 and 32 through conduits 97 and 98.

Since the left-hand and right-hand speed, direction and brake valves are identical in construction only one such group of valves will be described in detail and the left-hand control valve group will be considered for purposes of illustration and the description of the right-hand control valve group will be identical with identical reference numerals being utilized.

The left-hand brake valve 90 includes a valve spool 100 slidably disposed in a valve chamber 102 and is illustratively shown in the off condition. As was indicated, pressured fluid is supplied through conduit 88 into chamber 102 and is adapted to be directed to the left-hand brake or fluid coupling 60 through conduit 104. For this purpose, the valve spool 100 includes a land 105 normally blocking communication between conduits 88 and 104 and a spaced land 106 interconnected by a reduced area portion 107 to define chamber 102a.

The inlet or pressured conduit 88 also has a reduced size branch conduit 108 which is capable of providing initial reduced volume of flow into chamber 102a between lands 105 and 106 when valve spool 100 is moved from the off position. When the brake control valve is in the off condition, the chamber 102a is connected to the reservoir or sump by conduit 109 so that all of the fluid within this chamber is transferred to the reservoir or sump 59.

Upon initial movement of the valve spool 100 to the left as viewed in FIG. 3, the restricted conduit 108 will first come into communication with the chamber 102a to provide restricted flow into said chamber. During this initial part of the movement of the valve spool, the blocking of the drain conduit 109 will occur in progressive stages due to tapered grooves 110 defined adjacent one end of the land 106. The result of the restricted flow through conduit 108 into chamber 102a, as well as the progressive reduced communication between such chamber and the reservoir, will cause a gradual buildup of pressured fluid into fluid coupling 60 thereby providing smooth pressured engagement of the brake for one side of or one final drive means for the crawler tractor. This particular feature is essential to provide a smooth deceleration of either or both tracks without an abrupt motion.

According to one aspect of the invention, improved actuating means are provided for moving the brake control valve spool between neutral and engaged positions and which includes a lost motion connection between the actuator member and the valve spool and indicates to the operator the pressure of the fluid applied to the brake fluid coupling. The actuating means includes an actuating member 112 slidable in valve chamber 102 with a compression spring 113 engaging adjacent ends of the actuating member 112 and the valve spool 100. This will allow the actuating member to be moved to the completely engaged position to compress spring 113 and the force of spring 113 will move valve spool 100 to the engaged position.

The brake actuating means also includes means for providing the operator with an indication of the movement of the valve spool from the neutral position and the extent of pressure of the fluid supplied to fluid coupling or brake 60. This means includes a chamber 120 defined on one end of the control valve 90 and connected to conduit 104 through a further branch conduit 122. The chamber 120 includes mechanism which resists movement of the valve spool as a function of the pressure of fluid supplied to the fluid coupling 60. This mechanism includes a stem member 124 slidable in a reduced opening 125 between chambers 102 and 120 and having an enlarged plate 126 loosely fitted in chamber 120. The stem 124 has one end in engagement with the end of valve spool 100 and is maintained in a position corresponding to the neutral position of the valve spool 100 by a spring 127. Thus, the force of the pressured fluid supplied to fluid coupling 60 will act on the free end of stem member 124 to resist movement of the valve spool and give the operator a feel of the extent of engagement of fluid coupling 60. Also, when the actuator member 112 is released, the force of the pressured fluid in chamber 120 and force of spring 127 will return the valve spool to neutral or disengaged position.

The pressured fluid supplied to brake control valve 90 also supplies the pressured fluid to the speed control valve 92 which conditions the left-hand slide of the transmission for operation at either of two predetermined speeds. This particular arrangement is provided so that the drive mechanism for either of the endless tracks 12 will automatically be disengaged upon engagement of the fluid coupling or brake 60.

For this purpose, the pressured fluid from conduit 88 is received in a chamber 102b defined between spaced lands 105 and 130. The pressured fluid received in chamber 102b is directed to the speed control valve 92 through conduit 132. Thus, at any time the brake control valve spool is actuated, the flow of pressured fluid into chamber 102b will be interrupted by land 105 and conduit 132 will be in communication with the reservoir or sump through drain conduit 136 to thereby drain any pressured fluid which may be supplied to either of the fluid couplings 56 and 58, one of which is required to be in engagement for providing a power train between input shaft 22 and left-hand drive sprocket 14.

As was indicated above, one of the two clutches 34 and 36 and one of the two clutches 56 and 58 must be in engagement so as to provide a power train between the input shaft 22 and the left-hand sprocket 14 and the engagement of the respective clutches or fluid couplings is dependent upon the position of the left-hand direction control valve 86 and the left-hand speed control valve 92. The speed control valve 92 selectively directs pressured fluid from conduit 132 to either conduit 140 or 142 respectively communicating with fluid couplings 56 and 58. For this purpose, the control valve 92 includes a valve spool 144 slidable in a chamber 146 and movable in opposite directions from a predetermined condition or neutral position shown in FIG. 3. The valve spool 144 includes a land 148 blocking flow of fluid from conduit 132 when the valve spool is in the neutral condition. The valve spool 144 further includes reduced sections 150 and 152 disposed on opposite sides of land 148 with lands 154 and 156, respectively, disposed on opposite ends of the reduced area sections 150 and 152.

In the neutral condition of control valve 92, the conduit 140 communicates with a drain conduit 158 through reduced section 152 while conduit 142 is connected to drain conduit 160 through reduced section 150. Further branch conduits 162 and 164 are respectively connected to conduits 140 and 142 to provide a proper communication between the respective conduits with the respective drains when pressured fluid is supplied to either of the conduits in a manner which will become apparent hereinafter.

When the valve spool 144 is moved leftward as viewed in FIG. 3, conduit 132 will be placed in communication with conduit 142 through reduced area portion 150 to thereby supply pressured fluid to the fluid coupling 58 which conditions the left-hand track for operation at the higher of the two speeds for the associated track. Movement of the valve spool 144 to the left engaged position will also cause a blocking of conduit 140 by land 148 but the associated fluid coupling 56 will still be in communication with the drain conduit and the reservoir by branch conduit 162.

The valve spool 144 is held in any of three positions, i.e., high, neutral and low, by a spring biased ball 170 received in reduced area portions 172 defined on the valve spool and axially spaced to define the respective positions of the valve spool 144 within chamber 146.

The valve control means for conditioning the left-hand final drive further includes the direction control valve 86 which is capable of conditioning the transmission for either forward or reverse movement by selective engagement of clutches or fluid couplings 34 and 36. For this purpose, the control valve 86 includes a valve spool 200 slidably disposed in a chamber 202 and movable in opposite directions from a predetermined condition or neutral position shown in FIG. 3. In the neutral position, the pressured fluid supplied from conduit 84 to branch conduits 204, and 206 is blocked by lands 208 and 210, respectively, defined on the valve spool 200. Also, in this neutral position, the conduits 214 and 212, respectively, communicating with forward fluid coupling 34 and reverse fluid coupling 36, are in communication with the reservoir through reduced area portions 216 and 218 defined adjacent the respective lands 208 and 210.

Movement of the direction control valve spool 200 leftward, as viewed in FIG. 3, will place branch conduit 206 in communication with conduit 214 to supply pressured fluid to the coupling 34 thereby conditioning the transmission for operation of the vehicle in the forward direction. During this condition, the conduit 212 will remain in communication with the reservoir through the reduced area section 216 of valve spool 200.

Operation of the transmission to produce a reverse direction of movement is accomplished by moving the valve spool rightward, as viewed in FIG. 3, thereby placing or supplying pressured fluid from conduit 204 into conduit 212 and subsequently into the reverse clutch or fluid coupling 36. Again, the valve spool 200 is held in the neutral or respective engaged positions by a spring biased ball 220 received in an appropriately spaced reduced area portion 222 on valve spool 200.

Assuming that the left-hand brake is in the release condition and that the valve spools 144 and 200 are both in one of the engaged positions, it is still necessary to provide pressured fluid to either of the fluid couplings 30 or 32 so as to interconnect the input shaft 22 with the drive sprocket 14. This is accomplished by supplying pressured fluid from branch conduit 74 to either of the clutches 32 or 34 by appropriate manipulation of the range control valve 96.

For this purpose, the range control valve 96 includes a valve spool 230 slidable in a valve chamber 232 and movable between two positions to selectively supply pressured fluid to either conduit 97 or 98 thereby conditioning the transmission for operation in either the low or the high range. In the illustrated position, the range control valve 96 supplies pressured fluid from conduit 74 through branch conduit 236 into conduit 97 and fluid coupling 32 while reduced area portion 238 on valve spool 230 places conduit 98 in communication with the drain or reservoir.

Operation of the transmission in the low range is accomplished by moving the valve spool 230 to the right, as viewed in FIG. 3, thereby placing conduit 97 in communication with the reservoir or drain while supplying pressured fluid from conduit 74 into conduit 98. Again, the valve spool is held in the selected position by a spring biased ball 240 received in cooperating recesses 242 defined on the valve spool.

According to the primary aspect of the present invention, the pressure and flow of fluid supplied to the respective fluid couplings 30 and 32 is selectively controlled by reducing the pressure of the fluid supplied to the range control valve in response to movement of the valve means, including speed control valve 92 and direction control valve 86, to a neutral or predetermined condition. This is accomplished by a modulating valve 300 cooperating with the conduit 74 and which controls the pressure of the fluid in the conduit in response to movement of the left-hand and right-hand valve means to a neutral position. The modulating valve 300 has spaced inlet ports 302 and 304 respectively communicating with a chamber 306 defined in valve housing 308. The spaced inlet ports are connected to the conduit 74 through a by-pass conduit 310 having a restrictor 312 disposed between the respective inlet ports. The restrictor 312 may be of the adjustable type so as to properly adjust the flow of pressured fluid received by the inlet port 304. The valve chamber 306 also has an exhaust port in the form of spaced outlets 314 and 316 respectively connected to the reservoir or sump 59 through a conduit 318.

The modulating valve 300 further includes first and second cooperating portions or elements 320 and 322, respectively, slidably disposed in the chamber 306. The valve element or member 320 is slidably disposed in a reduced area portion at the end of the chamber 306 and is operatively interconnected with the valve element 322 by a compression spring or biasing means 324 acting on adjacent ends of the valve. In this manner the pressure of fluid in conduit 74 will be controlled by the movement of the valve elements 320 and 322, as will now be described.

The pressure of the fluid in conduit 74, affecting engagement of the respective fluid couplings 30 and 32, is dependent upon the amount of communication between inlet port 302 and outlet port 316, such amount of communication being determined by the position of the valve elements 320 and 322 as well as the compression spring 324. Substantially unrestricted flow is provided between inlet port 302 and outlet port 316 when either of the valve means 86 and 92 or 76 and 78 are in the neutral condition and this is accomplished by placing inlet port 304 in communication with reservoir 59. The system is also designed for dumping the pressured fluid to the inlet port 304 to the reservoir upon simultaneous movement of both of the speed control valves to the neutral position while both of the direction control valves are in an engaged position and, alternatively, when the range control valve is moved between engaged positions.

The means for connecting the inlet port 304 to the reservoir when the range control valve is moved between positions and when either of the direction control valves are moved to the neutral position includes a conduit 340 having a first branch conduit 342 communicating with the chamber 232, forming part of the range control valve 96. The range control valve includes a valve element 341 which blocks the flow of fluid in conduit 342 whenever the valve spool is in a condition for directing fluid to either of the clutches or fluid couplings 30 and 32. The valve element 341 includes spaced lands 344 and 346 defined on the valve spool 230 with a reduced area portion 348 therebetween defining a communication with the reservoir through a conduit 350. Thus, when the valve spool is moved between the high and low ranges, the conduit 342 is temporarily in communication with drain conduit 350 through the reduced area portion 348 to connect the inlet port 304 of modulator valve 300 to drain, for a purpose which will be described hereinafter.

The conduit 340 is also in communication with valve chamber 202 of the left-hand speed control valve 86 through a branch conduit 352 which is in communication with a drain conduit 354 through a valve element 355 when the valve spool 200 is in the neutral position. The valve element 355 includes a reduced area portion 356 flanked on opposite ends by lands 358 and 360. Thus, the valve element or control valve 355 connects inlet port 304 of modulating valve 300 to the reservoir or drain whenever the valve 86 is in a neutral condition. However, if the valve spool 200 is moved to either the forward or reverse condition, the respective lands 358 and 360 will block communication between the conduits 352 and 354 thereby blocking the flow between inlet port 304 and the reservoir 59.

The conduit 340 and the associated inlet port 304 are further capable of being connected to the reservoir through the right-hand direction control valve 76 by having conduit 340 in communication with the valve chamber 202 of the control valve 76 and having a control valve 355 incorporated in the valve spool of the right-hand forward-reverse control valve. The function and operation of right-hand direction control valve and valve element 355 are identical to that described in connection with left-hand direction control valve.

Thus, it can be seen that at any time either of the direction control valves 76 and 86 are moved to the neutral or a predetermined condition, the pressured fluid directed to inlet port 304 through restrictor 312 will be diverted to the reservoir and the pressure of fluid at inlet 304 will be reduced to substantially zero because the conduit 340 and associated branch conduits are all greater in size than the size of the restrictor 312.

As was indicated above, the inlet port 304 of modulating valve 300 is capable of being connected to the reservoir whenever the left and right speed control valves 78 and 92 are simultaneously in the neutral condition. This is accomplished by a conduit 370 leading from inlet port 304, downstream of restrictor 312, to valve chamber 146 of the left-hand speed control valve 92. Adjacent to but slightly spaced from the communication of conduit 370 with valve chamber 146, is a further conduit 372 which interconnects the valve chambers 146 of the respective speed control valves 78 and 92. Adjacent to and spaced from the inlet of conduit 372 to valve chamber 146 of right-hand speed control valve 78 is a further conduit 374 which connects the valve chamber with the reservoir in the transmission housing 20.

The valve spools 144 of the respective control valves 78 and 92 each have a valve 375 defined by reduced area portion 376 disposed between lands 154 and 378 so that the respective conduits 370, 372 and 374 are all in communication with each other whenever the valve spools are in the neutral condition shown in FIG. 3. In this condition, the inlet port 304 of modulating valve 300 is in direct communication with the reservoir 59 so that the pressure at inlet port 304 and on valve element 322 is reduced to zero. However, should either of the control valve spools 144 be moved to a position corresponding to an engaged position for the associated fluid couplings, the communication between the respective conduits 370, 372 and 374 will be blocked by one of the valve elements 375 thereby allowing a pressure buildup in inlet port 304, for a purpose which will be described hereinafter.

OPERATION OF MODULATOR VALVE

As was indicated above, the modulator valve 300, in an automatic condition, is responsive to (1) neutralization of both of the speed control valves for the respective tracks; (2) neutralization of either of the direction control valves for the respective tracks; or (3) shifting of the range control valve between the two ranges to control the pressure of fluid supplied to range control valve 96.

Assuming both tracks are being driven in a forward direction, the speed control valves are in an engaged position, the range control valve is in an engaged position, and both of the direction control valves are in an engaged position. In this condition, the connection between the reservoir 59 and the inlet port 304 of modulator valve 300 is completely blocked by valve elements 341, 355 and 375 thereby causing a buildup of pressure on the free end of the enlarged valve element 322 which will completely close communication between inlet port 302 and exhaust port 316 by having valve element 320 in its closed condition. This results from equal pressure being applied to the respective free ends of the valve elements 320 and 322 and the increased surface area of the free end of valve element 322 with respect to valve element 320.

Assuming a left-hand power turn is to be made, the left direction control valve is moved from a forward engaged position to a reversed engaged position and, during such movement, control valve 355 defined on left-hand valve spool 208 will place inlet port 304 in direct communication with the reservoir through conduits 340, 352 and 354. This will relieve the pressure on the free end of enlarged valve element or member 322 and allow valve element to move to the position shown in FIG. 3. At the same time, the pressured fluid on the free end of valve element 320 will cause a simultaneous upward movement of the valve element 320. As the valve elements move upwardly, communication between the inlet port 302 and the exhaust port 316 is provided so as to reduce the pressure in conduit 310 to substantially zero. There will still be a slight pressurization of the fluid within conduit 74 which is occasioned and determined by the force of spring 324 acting between valve elements 320 and 322. By way of example, the pressure of fluid in conduit 74 may be about 15 p.s.i.

In order to insure that the pressure of the fluid in conduit 74 is reduced substantially to zero while maintaining pressured fluid in conduit 72 when the inlet port 304 of valve 300 is connected to the reservoir, the hydraulic circuit includes a restrictor 380 disposed in conduit 74 upstream of the connection of modulator valve 300 to the conduit. The size of the restrictor 380 is selected to minimize loss of pressured fluid from the pump to the reservoir when the modulating valve is in the dump position while the flow capability through the exhaust port 316 is greater than the flow of fluid through restrictor 380. Thus, when the pressure of the fluid in inlet port 304 is relieved, the pressure to the range control valve 96 and, thus, the respective fluid couplings 30 and 32 is reduced substantially to zero.

Continuing the operation of a powered left-hand turn, when the left-hand direction control valve spool 208 reaches the reverse position for completing the conditioning of the valve, and engaging the reverse clutch 36, the flow of fluid from inlet port 304 to reservoir 59 is again blocked by valve 355 and the flow of pressured fluid through restrictor 312 will cause a buildup of pressure on valve element 322 of the modulator valve 300. This buildup of pressure will increase the spring force of spring 324 causing a downward movement of valve element 320 to thereby restrict the flow of fluid between inlet port 302 and exhaust port 316. When an equilibrium condition has been reached, the pressure of fluid on the enlarged area of valve element 322 will again maintain valve element 320 in a closed condition.

The same sequence of operation will occur when the valve spool 208 forming part of the right-hand direction control valve 76 is moved to the neutral position or when the range control valve is moved between the high and low ranges. Thus, the various dump valves incorporated within the range control valve and the respective direction control valves will automatically cause a reduction of pressure in the selected fluid coupling 30 or 32 and will subsequently cause an increase in the pressure when the associated valve is moved to an engaged condition.

As was indicated above, the inlet port 304 of modulating valve 300 is also capable of being placed in communication with the reservoir when both of the speed control valves are in the neutral condition. This is accomplished by having the respective valve chambers of the speed control valves serially interposed between the reservoir and the inlet port 304 of modulating valve 300. Thus, both of the valve spools 144 must be in a neutral condition so that the dump valves 375 forming part of the respective valve spools are in a condition to place the inlet port 304 in communication with reservoir.

MANUAL MODULATION

According to a further aspect of the present invention, means are provided for manually reducing the pressure within conduit 74 at the discretion of the operator. The manual means is incorporated within the modulating valve 300 in a simple and efficient manner and includes a valve stem 400 slidably disposed within an opening or valve seat 402 defined in the valve element 322 with the stem having a valve element 404 normally closing the opening 402. The valve element 404 is normally maintained in contact with valve seat 402 by a spring 406 having one end in engagement with the valve element 404 and the opposite end in engagement with a ring 408 carried by the valve element 322.

The valve stem 400 is also connected by a lost motion connection to the lower or smaller valve element 320 and such lost motion connection includes a transversely extending pin or ring 410 carried on the lower free end of the stem and engageable with a ring or element 411 carried on the valve element 320.

The valve stem 400 is moved relative to the upper valve element 322 and to subsequently move the lower valve element 320 through a manually operated actuator member 412. The manually operated actuator member has a lost motion connection with the valve stem 400 which includes a transversely extending pin 416 slidable in slots 418, which slots are closed at their lower end by a member 420. The actuator member is biased to a lowermost position by spring 414.

Thus, the lost motion connections between actuator 412 and stem 400 as well as between the stem 400 and valve 320 will allow the modulating valve to perform the automatic modulating function described above. However, should the operator decide to manually modulate the pressure of fluid in conduit 74, it is only necessary for him to raise the actuator 412 sufficiently to cause pin 416 to be engaged by element 420 thereby causing an unseating of valve element 404 within valve seat 402. This will cause a proportionate reduction in pressure of the fluid on the valve member 322 and result in a partial opening of communication between inlet port 302 and exhaust port 316. In this manner, the operator may accurately regulate the pressure of fluid in conduit 74 between the maximum and minimum limits defined herein above.

Furthermore, should the operator decide to completely disengage the particularly engaged clutch 30 or 32, it is only necessary for him to move the actuator 412 and the valve stem 400 sufficiently to cause interengagement between elements 410 and 411 whereupon subsequent upward movement of the actuator will increase the communication between inlet port 302 and exhaust port 316 of modulator 300. This allows the operator to completely dump all of the pressured fluid entering into conduit 74 to reduce the pressure on the selected clutch to zero.

PRIORITY FLOW CONTROL

The hydraulic circuit disclosed in FIG. 3 further includes mechanism for establishing a priority of flow between conduits 72 and 74 and establishing an operating pressure for the fluid delivered from the pump as well as lubricating the range clutches and the fluid couplings forming the brakes. This is accomplished by first establishing an operating pressure by a pressure regulator 500 communicating with conduit 70 and with a torque converter 502 forming part of the power train between the engine and the input shaft 22. The pressure regulator is, by way of example, set to cause all of the pressured fluid supplied by pump 61 to be directed to conduits 72 and 74 until a pressure of 265 p.s.i. is attained. Once this pressure has been reached, a pressure regulator 500 will divert pressured fluid to the torque converter 502 through conduit 504. Once the torque converter is at an operating pressure by the fluid supplied through conduit 504, pressure regulator 512 in conduits 514 and 510 leading to various clutches will maintain 40 p.s.i. in the converter and divert all the oil supplied by conduit 504 to the lubrication circuit. Under cold oil conditions causing high restriction in the lubrication circuit, the pressure regulator 506 will divert sufficient oil flow to drain conduit 508 and thence to reservoir 59 to limit pressure in the converter to 140 p.s.i. Under normal temperature conditions, the regulator 506 will remain closed and the converter pressure will be maintained at 40 p.s.i. by regulator 512, and all oil from conduit 504 will be diverted to lubrication conduit 510.

The means for establishing priority between the conduits 72 and 74 includes a priority pressure regulator 520 disposed in the conduit 74 upstream of restrictor 380 and set at some pressure which is less than the pressure setting of regulator 500. By way of example, the pressure regulator or priority valve 520 may be set at 250 p.s.i.

Thus, when the pump is originally actuated, all of the supply of pressured fluid delivered therefrom will be directed to the various control valves to be delivered to the associated fluid couplings. Once a first level of pressure is reached, as determined by the priority valve or regulator 520, the additional supply of pressured fluid will then be directed to the range control valve 96 for use in actuation of the range control fluid couplings 30 and 32. This insures that the selected direction and speed control clutches or fluid couplings are completely engaged before the range control valve is supplied with pressured fluid for engagement of the range control clutches. Furthermore, the setting of the pressure regulator 500 to a pressure greater than that of priority regulator or valve 520 will also cause complete engagement of the range control clutch prior to supplying pressured fluid to the torque converter 502. As can be appreciated, the torque converter must be pressured in order for the power to be supplied from the engine to the transmission 20.

FIGURE 4 EMBODIMENT

The modified hydraulic control circuit disclosed in FIG. 4 in substantially identical to that disclosed in FIG. 3 with the following exceptions:

(1) An improved type of mechanical interlock is provided between the speed control and direction control valves for each track so as to be capable of actuating both control valves with a single control lever; and (2) the manner of connecting the modulating valve to the reservoir has been changed.

Thus, like reference numerals have been retained for all of the parts which are identical to the embodiment disclosed in FIG. 3. Also, the modified control valves have been designated by the same reference numerals with the addition of the suffix a.

The modified direction control valve 92a, as in the embodiment disclosed in FIG. 3, has pressured fluid supplied through the left-hand brake control valve 90 and into conduit 132. Likewise, the respective speed control clutches are connected to the control valve through conduits 140 and 142.

The control valve 92a includes a valve spool 600 slidable in a valve chamber 602 with spaced lands 604 and 606 interconnected by a reduced area portion 608 defining a chamber 609 which is at all times in communication with the inlet conduit 132 which supplies pressured fluid to the clutches 56 and 58 when the valve spool is actuated. The valve spool 600 further includes a land 610 spaced from land 604 and interconnected by a reduced area portion 612 to define a chamber 614 between valve bore 602 and reduced area portion 612.

The valve chamber 602 also has axially spaced conduits 616 through 622 each communicating with the reservoir or drain 59 defined in the transmission unit housing.

Considering now the direction control valve 86a, pressured fluid is, as in the embodiment of FIG. 3, supplied to a valve chamber 630 at axially spaced points through inlet conduits 204 and 206. However, in the modified embodiment the valve spool 632 is completely contained within the valve chamber 630 and is moved in response to movement of the speed control valve, as will become apparent hereinafter. The valve spool 632 includes spaced lands 634, 636 and 638 with adjacent pairs of lands respectively interconnected by reduced area portions 642 and 644 to define chambers 650 and 652.

In the position illustrated, pressured inlet conduit 206 and conduit 212 leading to the forward direction control fluid coupling 34 are both in communication with chamber 650 so that the fluid coupling 34 is in the engaged position. In this position, chamber 652 connects conduit 214 to reservoir through a drain conduit 654. An additional axially spaced drain conduit 658 communicates with the valve bore 630, for a purpose which will become apparent hereinafter.

The control valve 86a further includes means for retaining the valve spool in the respective forward and reverse engaged position which includes a single recess 660 receiving axially spaced biased balls 662 and 664 respectively slidable in spaced bores 666 communicating with valve chamber 630.

According to one aspect of the modified embodiment of the present invention, means are provided for moving the direction control valve 86a in response to movement of the speed control valve 92a. This means includes cooperating elements interlocking the respective valve spools during a portion of movement of the valve spool 600 in the valve chamber 602.

The interlock between the valve spool 600 and 632 includes a pin 670 slidable in a transversely extending opening 672 formed on the valve spool 600. One free end of the pin 670 is slidable on the exterior surface of the valve spool 632 and is adapted to be received into the recess 660 when in proper axial alignment therewith. The upper free end of the pin 670 is in engagement with a camming surface defined on the interior of the valve chamber or bore 602. The camming surface includes flat portions 674, 676 and 678 extending parallel to the axis of the valve chamber or bore 602 with inclined camming surfaces 680 and 682 interconnecting the flat surfaces.

Thus, if the speed control valve 92a is moved leftward from the position shown in FIG. 4, the relative position between the pin 670 and the valve spool 600 will remain unchanged. However, should the valve spool 600 be moved rightward from the left neutral position shown to the adjacent low position, the pin 670 will be forced along the inclined surface or ramp 680 to cause the lower end of the pin 670 to be forced into the recess 660. Thus, any subsequent movement of the speed control valve spool 600 to the right from the left low position will cause a simultaneous movement of the direction valve spool 632 because the lower end of the pin 670 will be forced to remain within the recess 660 by the parallel camming surface 676.

Continued movement of the valve spool 600 to the right will eventually cause valve spool 632 to assume a position wherein the spring biased ball 664 will be received in recess 632 to condition the left-hand track for drive in the reverse condition. Thereafter, subsequent movement of the valve spool 600 to the right will allow movement of the pin 670 out of the recess 660 as it is moving along the inclined ramp 682 to be subsequently in engagement with parallel camming surface 678 so that the valve spool will remain in the right-hand position as the valve spool 600 is moved between the right low, neutral, and high positions.

This arrangement is of considerable importance for an operator of a vehicle since it allows him to completely control one track of the vehicle with a single control lever. Since a crawler-type tractor of the disclosed type, does not have any type of steering wheel, the operator is thus in a position to maintain his two hands on the left- and right-hand control levers to allow him to continuously manipulate the condition of both tracks without a shuffling of the hands between various control levers.

Again, as is the case in the embodiment of FIG. 3, the right-hand control means for controlling the speed and direction of the right-hand tracks are identical in construction to the left-hand control means and are operated in the same manner. Thus, it is believed that the detailed construction and operation need not be repeated. Suffice it to say that control valve 76a is identical in construction to control valve 86a while control valve 78a is identical in construction to control valve 92a.

According to another aspect of the modified form of the present invention, the means for connecting the upper inlet port 304 of modulator valve 300 to the reservoir is slightly modified and further simplified so that only a single conduit is required for connection of the modulator valve to the reservoir at any time when either of the valve control means for the respective tracks is in the neutral position.

In the modified embodiment, this means again includes restrictor means 312a between the respective inlet ports 302 and 304 of the modulator valve which is of the adjustable type and includes a needle valve element 700 received in a threaded bore 702 so as to be able to readily adjust the flow of fluid between the two inlet ports 302 and 304.

The means for connecting inlet port 304 to the reservoir when the range valve is shifted includes conduit 340 connected to valve chamber 232 of range control valve 96 in a manner identical to that disclosed in the FIG. 3 embodiment and this conduit is placed in communication with drain conduit 350 by valve element 341. Thus, when the valve spool 230 is moved between the high and low ranges, conduit 340 is in communication with the reservoir through conduit 350.

In the modified embodiment, the means for connecting the reservoir to the modulator valve whenever the left-hand or right-hand transmission control unit is in the neutral condition includes a single branch conduit 710 leading from conduit 340 and having a first portion disposed adjacent the valve 78a and a second portion adjacent the valve 92a. The conduit 710 has first and second two position valves 712 which are respectively operable in response to movement of the valve spools 600 forming portions of the control valve means for each of the tracks. Each valve 712 includes a valve element 714 slidably disposed in a bore 716 which extends across conduit 710 and is in communication with valve chamber 602. The valve element is normally biased to a position which allows flow of fluid in conduit 710 by a valve spring 718 disposed in bore 716 and having its free end in engagement with the valve element 714.

The upper free end of the valve element 714 is in sliding engagement with the peripheral surface of the valve spool 600 and is adapted to be moved between open and closed positions in responsive to movement of the valve spool 600 within valve chamber or bore 602. For this purpose, the valve spool has axially spaced inclined camming surfaces 720 defined on the peripheral surface thereof which are interconnected by flat surfaces 722. The inclined camming surfaces 720 are axially spaced on the valve spool 600 so that the valve element 714 will open communication in conduit 710 whenever both valve spools are in one of the three neutral conditions.

Considering the operation of the modified embodiment, and assuming that right-hand control valve is in the neutral position shown, movement of the left-hand control valve spool 600 in either direction from the neutral position shown will cause the free end of the valve element 714 to be moved out of the inclined camming surface 720 and into engagement with the flat camming surface 722. Movement of the valve element 714 from the position shown will block the flow of fluid in conduit 710 between modulator valve inlet port 304 and the reservoir 59.

Once the valve spool 600 for left-hand speed control valve 92a is moved to an engaged position and remains in the engaged position, right hand control valve may be moved in either direction to the next high or low position without opening communication in conduit 710. This arrangement provides for maintaining pressure on fluid in conduit 74 while either of the valve spools are moved between speed conditions in the same direction of movement. However, movement of both valves 78a and 92a to a neutral position will open communication in conduit 710. This arrangement provides for maintaining pressure on fluid in conduit 74 while either of the valve spools are moved between speed conditions in the same direction of movement. However, movement of both valves 78a and 92a to a neutral position will open communication in conduit 710 to reduce the pressure in conduit 74 leading to range control valve 76 in a manner previously described.

SUMMARY

Thus, it can be seen that a hydraulic control circuit constructed in accordance with the present invention will provide a means for automatically controlling the flow and pressure of fluid to either of two range control clutches which must at all times be in engagement for providing a complete power train to either of the tracks of the crawler-type tractor. Also, when either of the tracks is shifted from a forward to a reverse direction, the pressure to the range clutches is automatically relieved for a short period of time sufficient to allow the operator to complete the direction control shift for the particular track and, once such direction control shift has been accomplished, the pressure supplied to the range control clutches will automatically increase to its operating level so as to provide for smooth engagement of the power through the transmission avoiding any jerky motion which has heretofore been common. Furthermore, the improved hydraulic control circuit includes a manual override which may be activated at the discretion of the operator to neutralize the entire transmission at any time.

Also, the improved hydraulic control circuit incorporates mechanism including an improved valve which allows the brakes to be operated by the same control circuit rather than having a separate hydraulic circuit for the power brakes. The additional advantage of the control circuit disclosed in the embodiment of FIG. 4 wherein the two control valves controlling the speed and direction for a single track are capable of being operated by a single control lever are of course important, as was set forth hereinabove.

What is claimed is:

1. A control system for supplying pressured fluid to fluid couplings of a transmission comprising a hydraulic circuit including a pressured fluid source, first and second valve means, a reservoir, conduit means for connecting said reservoir and said source to said valve means, and means selectively actuating said valve means, the improvement of a modulating valve in said conduit means between said source and one of said valve means for controlling the pressure of fluid supplied to said one of said valve means from said source, and means cooperating with said modulating valve and responsive to (1) a predetermined condition of the other of said valve means for reducing the pressure of said fluid supplied to said one of said valve means and (2) increasing the pressure of said fluid supplied to said one of said valve means in response to change of said other of said valve means from said predetermined condition.

2. A control system as defined in claim 1, including the further improvement of said modulating valve comprising first and second cooperating portions each, respectively, communicating with said source and said reservoir, and said last means comprises second conduit means between said second portion and said reservoir and at least one valve in said second conduit means responsive to movement of said other of said valve means for opening and closing communication between said second portion and said reservoir.

3. A control system as defined in claim 2, wherein said at least one valve has first and second positions with biasing means normally maintaining said at least one valve in said first position allowing flow from said second portion to said reservoir and cam means on said other of said valve means moving said at least one valve to said second position blocking flow between said second portion and said reservoir when said other of said valve means is changed from said predetermined condition.

4. A control system as defined in claim 2, including the further improvement of said modulating valve including a housing defining a valve chamber having first and second valve elements slidable therein, a port on said chamber between said elements communicating with said reservoir, a spring between and acting on said elements with a free end of said first element communicating with said source and selectively movable to connect said source to said port, and means between said source and the free end of said second valve element restricting flow of fluid whereby opening of said at least one valve causes reduction of pressure on said free end of said second element to allow simultaneous movement of said elements and a subsequent reduction in pressure of fluid to said one of said valve means.

5. A control system as defined in claim 1, including the further improvement of said last means further including means responsive to (1) movement of said one of said valve means to a predetermined condition for reducing said pressure of said fluid supplied to said one of said valve means and (2) movement of said one of said valve means from said predetermined condition for increasing said pressure.

6. A control system as defined in claim 1, including the further improvement of manual means incorporated in said modulating valve for, at any time, reducing the pressure of said fluid supplied to said one of said valve means.

7. A control system as defined in claim 1 and wherein said second valve means includes speed and direction control valve spools respectively slidable in valve housing chambers and said last means includes second conduit means interconnecting said chambers and said modulating valve, and each valve spool including a valve element allowing flow through said second conduit means to said reservoir when the subject valve spool is in predetermined condition and blocking said conduit means when the subject valve spool is moved from said predetermined condition.

8. A control system as defined in claim 1, and wherein said second valve means includes a speed valve spool and a direction valve spool respectively slidable in valve chambers, including the further improvement of interlocking means operatively connecting one of said valve spools with the other of said valve spools for simultaneous movement during a portion of the movement of said other of said valve spools.

9. A control system as defined in claim 1, including the further improvement of said modulating valve comprising a housing defining a chamber having spaced inlet ports communicating with said source, first and second valve members slidable in said chamber and disposed between said ports with a spring acting on said members to move said members toward said ports, restrictor means between said ports restricting flow of fluid from said source to one of said inlet ports and an exhaust port in said housing between said inlet ports, said last means including valve means communicating with said one of said inlet ports and a reservoir whereby opening of said valve means causes reduction in pressure on said second valve member allowing simultaneous movement of said valve members to place the other of said inlet ports in communication with said exhaust port thereby reducing pressure of fluid to said one of said valve means.

10. A control system as defined in claim 9, including the further improvement of override means in said modulator valve comprising means defining an opening in said second valve element and communicating with said exhaust port, a valve element normally seated in said opening and an actuator having a lost motion connection with said valve element and operable to unseat said valve element reducing pressure on said second valve member.

11. A modulating valve for selectively controlling the engagement of a fluid coupling by control of the pressure of fluid supplied to the coupling and wherein a conduit connects a pressured fluid source to the coupling, comprising a first relief in communication with said conduit, a second relief cooperating with said first relief, conduit means producing restricted flow from said pressured fluid source to said second relief, and means selectively connecting said conduit means to a reservoir whereby to control the pressure of fluid in said conduit.

12. A modulating valve as defined in claim 11, including the further improvement of manual means cooperating with said second relief for connecting said conduit means to said reservoir to reduce the pressure in said conduit.

13. A modulating valve as defined in claim 11, including the further improvement of a valve chamber having an exhaust port with said first relief comprising a first valve element movable in said chamber and partially blocking flow from said conduit to said port, said second relief comprising a second valve element movable in said chamber and spaced from said port, biasing means acting between said valve elements, with free ends of said valve elements respectively communicating with said conduit and said conduit means whereby to control the position of said first valve element as a function of the pressure in said conduit and conduit means.

14. A modulating valve as defined in claim 13, including the further improvement of manually operable means alternately controlling the pressure of fluid in said conduit and including means defining an opening in said second valve element and communicating with said exhaust port, a valve member normally closing said opening and an actuator member for moving said valve member to place said free end of said second valve element in communication with said exhaust port.

15. A fluid control system including first and second valves each comprising a valve spool axially slidable in a valve bore, the improvement of means for moving said second valve spool during portions of travel of said first valve spool, said means comprising first means defining a recess on a surface of said second valve spool, second means defining a transverse opening in said first valve spool, a member received in said opening and having a free end in engagement with said surface, and means on said first valve for maintaining said member in said recess during portions of sliding movement of said first spool in said bore whereby said second spool is moved in response to said first valve spool.

16. A fluid control system as defined in claim 15, and wherein said bores are in spaced parallel relation with a slot interconnecting said bores, the further improvement of said member received in said slot and said last means comprising a camming surface on said bore with said camming surface having axially spaced and radially offset portions interconnected by inclined portions with an opposite end of said member in engagement with said camming surface, said inclined portions causing movement of said free end into and out of engagement with said recess and at least one of said parallel portions maintaining said free end in said recess.

17. A hydraulic control circuit for selectively controlling flow of pressured fluid to a controlled device and including a fluid source, a control valve having a valve spool slidable in a valve bore, and conduit means connecting said source and reservoir to said bore, the improvement of an actuator member, a resilient connection between said actuator member and said valve spool for moving said valve spool as a function of movement of said actuator and supplying pressured fluid through said control valve and mechanism resisting the movement of said valve spool as a function of the pressure of fluid supplied to the controlled device.

18. A hydraulic control circuit as defined in claim 17, and wherein said valve spool includes spaced lands defining a chamber with said reservoir normally communicating with said chamber, the further improvement of means progressively reducing communication between said reservoir and said chamber during initial movement of said valve spool in said chamber from a neutral position, and means producing restricted flow from said source to said chamber during at least a portion of said initial movement whereby to initially control the flow of fluid through said valve.

19. A hydraulic control circuit as defined in claim 17, in which said mechanism includes a chamber spaced from said bore, means defining an opening connecting said chamber to said bore, a member slidable in said opening and having opposite ends with one end in engagement with said valve spool and an opposite end in said chamber, and a port on said bore receiving pressured fluid passed through said valve and means connecting said port to said chamber.

* * * * *

PO-1050
(5/69)

UNITED STATES PATENT OFFICE
CERTIFICATE OF CORRECTION

Patent No. 3,659,630  Dated June 2, 1972

Inventor(s) Robert G. Honeyager & James C. Rigney

It is certified that error appears in the above-identified patent and that said Letters Patent are hereby corrected as shown below:

Column 2, line 28, delete the first "and" and in its place put --or--.

Column 10, line 1, the second "in" should be --is--.

Column 12, lines 29-34, delete "This arrangement provides for maintaining pressure on fluid in conduit 74 while either of the valve spools are moved between speed conditions in the same direction of movement. However, movement of both valves 78a and 92a to a neutral position will open communication in conduit 710."

Signed and sealed this 26th day of September 1972.

(SEAL)
Attest:

EDWARD M. FLETCHER, JR.
Attesting Officer

ROBERT GOTTSCHALK
Commissioner of Patents